United States Patent [19]
Johnson et al.

[11] Patent Number: 5,860,291
[45] Date of Patent: Jan. 19, 1999

[54] CHAMBERED FORCED COOLING METHOD

[75] Inventors: Greg P. Johnson, Boise; Rick Larsen; Craig L. Boe, both of Nampa, all of Id.

[73] Assignee: Micron Electronics, Inc., Nampa, Id.

[21] Appl. No.: 880,175

[22] Filed: Jun. 20, 1997

Related U.S. Application Data

[62] Division of Ser. No. 835,138, Apr. 4, 1997.
[51] Int. Cl.⁶ .............................. F25D 23/12; H05K 7/20
[52] U.S. Cl. .......................................... 62/259.2; 361/692
[58] Field of Search .................................. 62/259.1, 404; 361/676, 677, 678, 687–688, 689, 690, 692–693, 694, 695

[56] References Cited

U.S. PATENT DOCUMENTS

| | | |
|---|---|---|
| 3,523,156 | 8/1970 | Phillips, Jr. . |
| 3,873,757 | 3/1975 | Berke et al. . |
| 4,267,995 | 5/1981 | McMillan . |
| 4,289,924 | 9/1981 | Pearce, Jr. et al. . |
| 4,296,454 | 10/1981 | Wong . |
| 4,527,285 | 7/1985 | Kekas et al. . |
| 4,860,163 | 8/1989 | Sarath ....................................... 361/695 |
| 5,063,477 | 11/1991 | Paggen et al. ............................ 361/695 |
| 5,066,832 | 11/1991 | Clarey et al. . |
| 5,101,079 | 3/1992 | Rodrigues . |
| 5,136,465 | 8/1992 | Benck et al. . |
| 5,168,424 | 12/1992 | Bolton et al. ............................ 361/695 |
| 5,173,819 | 12/1992 | Takahashi et al. .................... 360/97.03 |
| 5,218,514 | 6/1993 | Huynh et al. . |
| 5,254,808 | 10/1993 | Rodrigues et al. . |
| 5,287,244 | 2/1994 | Hileman et al. ......................... 361/687 |
| 5,378,174 | 1/1995 | Brownlie et al. . |
| 5,432,674 | 7/1995 | Hardt . |
| 5,440,450 | 8/1995 | Lau et al. . |
| 5,473,507 | 12/1995 | Schwegler et al. . |
| 5,477,417 | 12/1995 | Ohmori et al. .......................... 361/695 |
| 5,484,012 | 1/1996 | Hiratsuka .................................. 165/40 |
| 5,493,457 | 2/1996 | Kawamura et al. .................... 369/75.1 |
| 5,721,670 | 2/1998 | Cochrane et al. ....................... 361/695 |

*Primary Examiner*—William Doerrler
*Attorney, Agent, or Firm*—Knobbe, Martens, Olson & Bear LLP

[57] ABSTRACT

An apparatus and method for cooling components within a housing, such as those of a computer system. Multiple chambers are created within the housing, each having at least one cooling fan and a corresponding air inlet. These chambers are segregated by an internal divider or baffle element which effectively eliminates airflow between the chambers. Cooling fans within the housing are utilized as exhaust fans such that, in conjunction with the effect of the baffle element, substantially linear airflow is maintained within each chamber. Certain critical heat-producing components of the system are placed in proximity to the air inlets in each chamber, thereby maximizing the cooling of the components for a given fan rating and inlet air temperature, and increasing cooling system efficiency by substantially reducing the cooling of components that are insensitive to heat.

12 Claims, 11 Drawing Sheets

CHAMBERED FORCED COOLING METHOD

RELATED APPLICATIONS

This application is a divisional of U.S. patent application Ser. No. 08/835,138, filed Apr. 4, 1997.

BACKGROUND OF THE INVENTION

1. Field of the Invention

The present invention relates to systems for controlling the cooling of components in an enclosed environment, such as those in a micro- or mini-computer system. More specifically, the invention relates to the use of cooling baffles and arrangement of various system components to enhance the cooling of certain heat-sensitive internal components.

2. Description of Related Technology

Many electrically powered systems include environments having heat-producing elements contained within a substantially enclosed area. For example, within a typical computer system, the heat generated internally by certain components such as integrated circuit devices, power supplies, motors and transformers, may be substantial. Such heat must be dissipated at a rate sufficient to maintain the temperature of critical system components at an acceptable level in order to preclude premature component and system failure. While small increases in operating temperature may not be immediately detrimental to the operation of such components, long term operation at these elevated temperature levels may adversely impact their longevity and reliability. This is particularly true of comparatively sensitive integrated circuit or data storage devices such as the central processing unit (CPU) or disk drives, respectively, which may suffer disproportional reductions in longevity with incremental increases in operating temperature. Additionally, mechanical effects resulting from wide variations in temperature and high peak temperatures may eventually induce component failures.

It has been recognized that temperature-sensitive components such as ICs and disk drives often act as significant heat sources themselves. In such cases, it may not be sufficient to simply maintain the ambient air within the computer chassis at a temperature below the maximum allowable temperature for these devices, since each device may not dissipate heat effectively enough to maintain its temperature within acceptable limits. Localized or forced cooling of these components often must be used to increase the rate of heat transfer.

Generally, increased cooling of computer components may be accomplished by enhanced convective, radiant or conductive heat transfer out of the component. Heat sinks are sometimes used to enhance conductive heat transfer by conducting heat from the component into the sink, which is then cooled by convective (and to a much lesser degree, radiative) heat transfer. Assuming air as the cooling medium and a constant inlet temperature, convective cooling of a component, whether it has a heat sink or not, can be facilitated by increasing the airflow over the component and, depending upon the component and system configuration, inducing more laminar or more turbulent flow around the component.

Increased airflow can be obtained by increasing fan capacity, or alternatively, by reducing the obstructions to airflow around the components of concern. Hence, for a given fan capacity, simply relocating the heat-producing components with respect to existing air flow and making the flow path less tortuous can significantly enhance heat transfer. This is particularly true when these components are placed in direct proximity to the inlet of the cooling air, which has the lowest temperature of any region within the housing.

With respect to turbulence, inwardly blowing fans induce substantial turbulence in the chassis, especially in the vicinity of the fan discharge. Turbulent flow is generally more useful for removing heat from large surface-area components such as finnned heat sinks, while laminar flow is often preferable for other components. Discharge or exhaust systems create a more laminar flow within the chassis than do inlet systems, since the turbulence produced by the fan discharge is outside the chassis. Therefore, since most internal computer components are not equipped with heat sinks which can benefit from turbulence, laminar or linear flow is generally preferable.

In addition to the factors discussed above, dedicating the airflow created by a fan/inlet combination to a limited number of components can even further increase the cooling of those components. For example, providing a power supply with its own fan and source of inlet air is obviously more effective in terms of cooling than simply disposing the power supply within the interior of the computer (along with all of the other components) somewhere between the fan and the air inlet.

Taking the aforementioned concepts together, it can be seen that the cooling of internal computer components may generally be optimized through the use of a plurality of dedicated cooling fans placed in an exhaust orientation, and the location of critical components in direct proximity to dedicated air inlets.

A substantial number of cooling system configurations aimed at enhancing the cooling of heat producing components within the computer chassis are described in the prior art. These systems utilize a variety of different combinations of fan placement, internal component/board arrangement, ventilation hole placement, and electrical cable routing. For example, the prior art system of FIGS. 1 and 2 introduces air into the housing 120 via air inlets 10 and an inlet ventilation fan 20 located in the top, sides, or front of the chassis, and exhausts comparatively hotter air via one or more cooling fans 30 located at the rear of the chassis.

Figure 1:
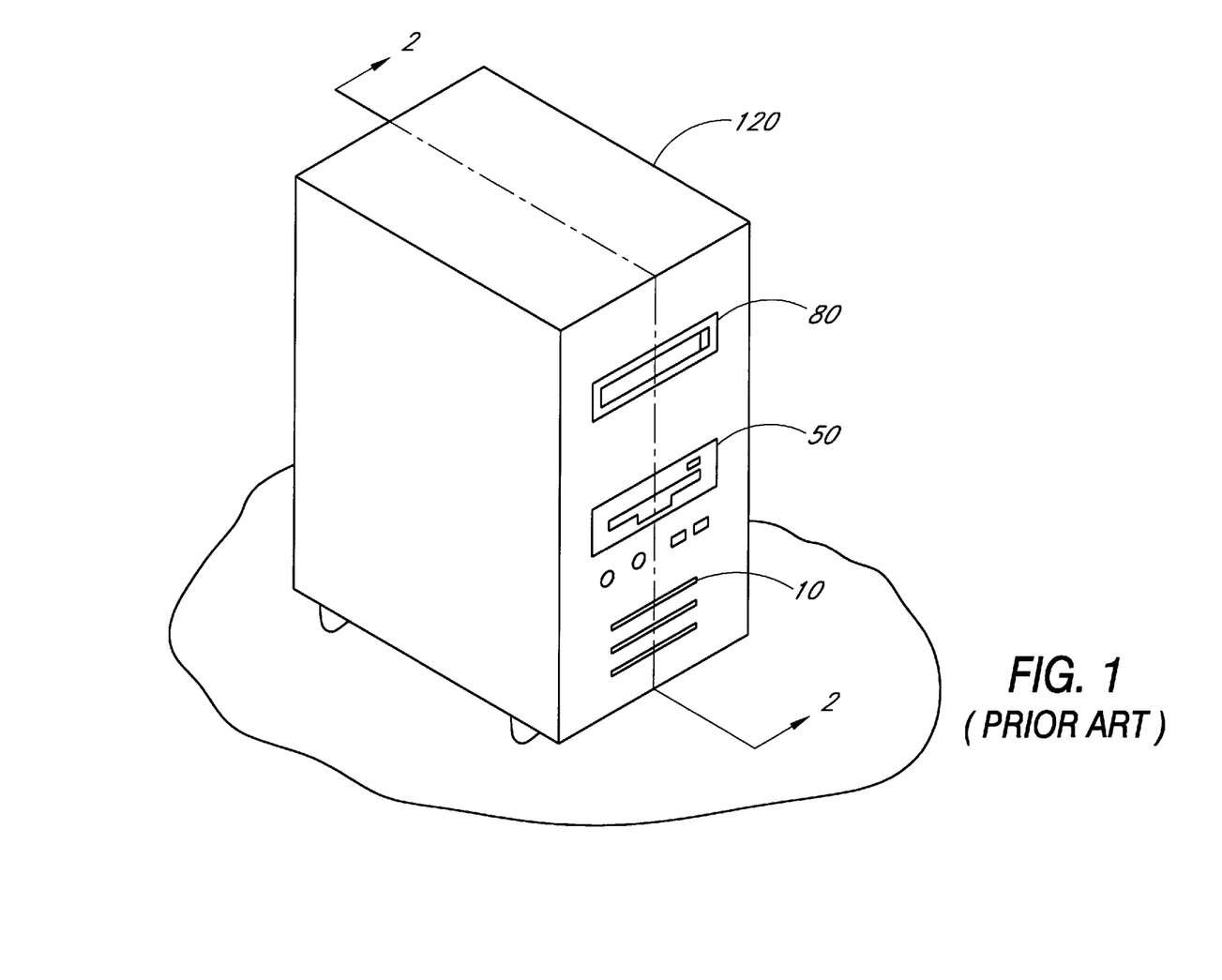
FIG. 1 is a perspective view of a typical prior art tower computer system.
Figure 2:
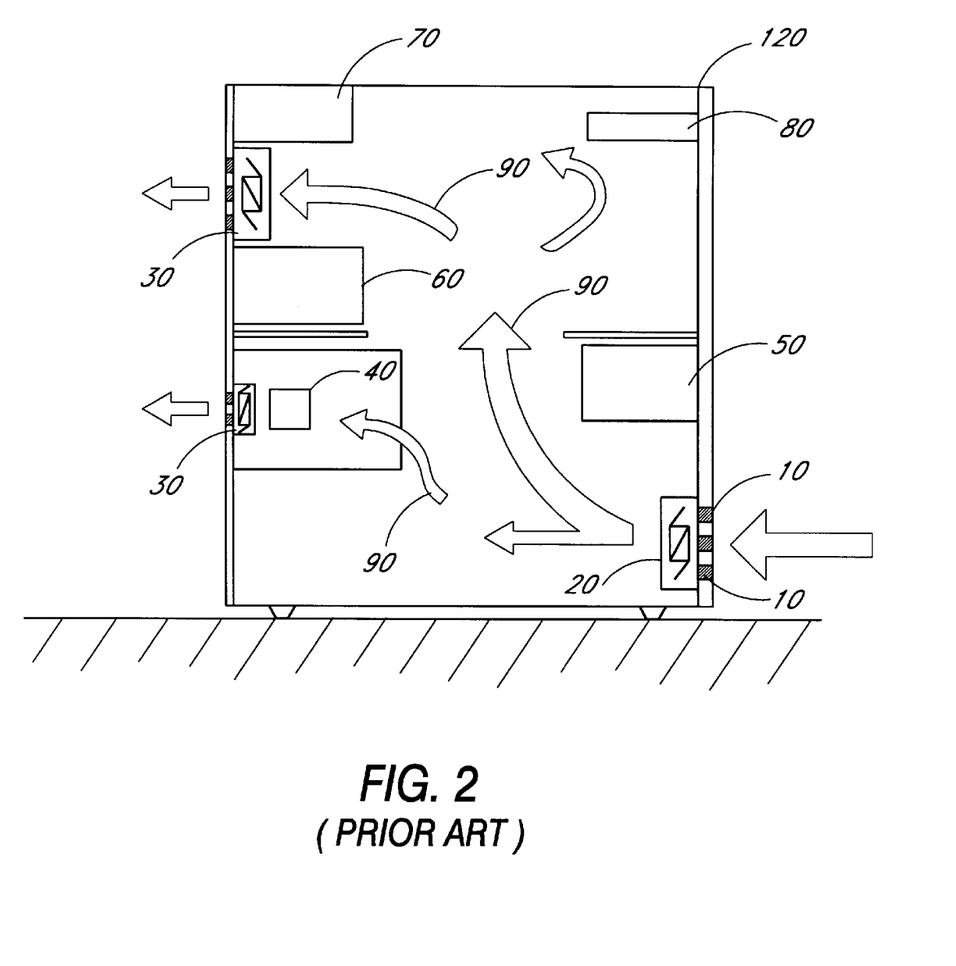
FIG. 2 is a side crossectional view of the typical prior art tower computer system, taken along line 2—2 of FIG. 1.

The placement of the critical components within these prior art systems, including the CPU 40, floppy disk drive cage 50, power supply 60, hard disk drive cage 70, and CD-ROM drive 80, is not optimized in that the components are only indirectly cooled by the inlet air, and/or some of the cooling air is diverted to components which do not require cooling. Furthermore, as shown in FIGS. 1 and 2, prior art computer systems do not coordinate the placement of heat-producing components with that of the fan and the air inlets such that substantially linear airflow is maintained throughout the interior volume of the computer; many systems create a tortuous airflow path 90 thereby effectively reducing the flow of air for a given fan capacity.

Other attempts at improving the air cooling of electrical components within an enclosed environment are disclosed in several United States patents, which are discussed below.

U.S Pat. No. 5,218,514 discloses a personal computer housing system having a plurality of air intakes located around the sides and front of the housing, with a fan mounted at the rear which draws air through the intakes. System I/O and expansion cards are mounted longitudinally from front to back at various orientations and elevations such that air drawn in the front and side intakes passes over the cards before being exhausted by the cooling fan. However, this arrangement provides a somewhat tortuous airflow path, thereby increasing flow resistance. Furthermore, air may circulate within substantially all of the interior volume of the enclosure, potentially cooling components which do not require cooling.

U.S Pat. No. 5,440,450 discloses a housing having an integrated cooling channel running linearly through one dimension of the computer chassis. A fan is mounted at one end of the channel, and heat radiating fins run the length of the channel. The heat producing power supply is mounted directly in contact with the channel. The motherboard is mounted adjacent to the channel such that some of the air being drawn into the intake of the channel by the cooling fan is ultimately passed over the motherboard (and CPU) before changing direction and being ingested into the channel. This air is drawn into the chassis through a series of perforations in the rear of the chassis. Hence, this arrangement suffers disabilities as those previously described in that the cooling airflow path is tortuous, and system efficiency is reduced through the cooling of non-critical components.

U.S. Pat. No. 5,432,674 discloses a computer tower unit having an internal airflow control baffle. The unit has two cooling fans (one "system" fan and one dedicated to the power supply unit) which draw air through a pair of exterior openings generally opposed from the fans. This arrangement obviates the need for a separate (i.e., third) disk drive cooling fan since the baffle redirects a portion of the air drawn in by the upper fan through the upper inlet to pass over the disk drive unit Air drawn in through the lower and upper inlets passes in part over the motherboard and CPU after being redirected. The baffle pivots outward during maintenance to permit access to the motherboard. In this system, the primary function of the baffle is redirection of the internal airflow of the unit (especially that originating from the lower inlet), which changes directions in several parts of the housing.

In view of the foregoing, it can be appreciated that existing enclosure cooling systems have not adequately solved the problems of optimizing the operating temperature of certain heat-sensitive components while maintaining high cooling system efficiency and minimizing electrical power requirements. Therefore, it would be most desirable to provide an improved cooling apparatus for a computer system which would overcome the limitations of the prior art and provide for the optimized cooling of critical system components while maintaining a high overall efficiency. Furthermore, it would be desirable to design such an apparatus to facilitate both the routing of internal system wiring and periodic system maintenance.

SUMMARY OF THE INVENTION

The present invention satisfies the aforementioned needs by providing an improved apparatus and method for cooling the internal components of a computer system or other electronic device.

In a first aspect of the invention, increased cooling of the internal components of the computer is provided through the combination of component placement, selected baffling of external air inlets, and use of one or more internal cooling baffle elements (dividers). Specifically, two or more interior housing chambers are created, each having at least one airflow generator and air inlet. These chambers are disposed on either side of the aforementioned internal baffle elements, which effectively eliminates any airflow between the chambers. All airflow generators are oriented so as to exhaust air and minimize turbulence within these interior chambers. Certain critical heat-producing components of the system, such as the disk drives and CD-ROM drive, are placed in proximity to the air inlets in each chamber. Inlet air is drawn over these components before being heated by other internal components, thereby maximizing their cooling for a given fan rating and inlet air temperature. Furthermore, the diversion of cooling airflow to components which do not require cooling can be virtually eliminated, thereby increasing cooling system efficiency.

In a second aspect of the invention, the improved internal cooling baffle element allows for the passage of one or more electrical wires between the aforementioned cooling chambers. The baffle uses a plurality of flexible fingers which accommodate most any size and/or configuration of wiring, yet which largely eliminate the flow of air through the element. In one embodiment, the baffle may be easily removed during maintenance to facilitate access to other system internal components.

These and other objects and features of the present invention will become more fully apparent from the following description and appended claims taken in conjunction with the following drawings.

DETAILED DESCRIPTION OF A FIRST EMBODIMENT

Reference is now made to the drawings wherein like numerals refer to like parts throughout.

Figure 3:
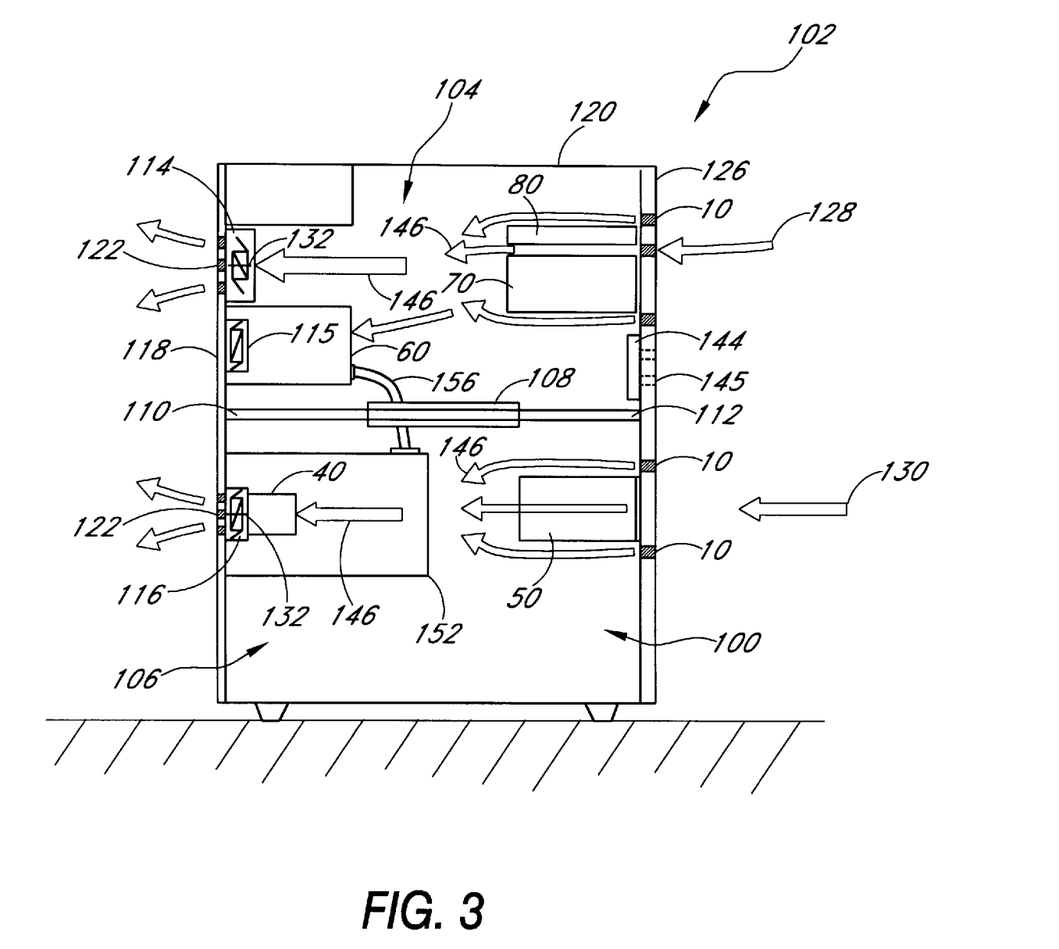
FIG. 3 is a side crossectional view of a first preferred embodiment of a tower computer system employing the chambered cooling system of the present invention.

In the first embodiment illustrated in FIG. 3, it is seen that the internal components of a computer system 102 are cooled through use of a dual-chambered arrangement within the computer external housing 120. The interior volume of the tower/minitower computer system 102 is segregated into two essentially discrete "over-under" chambers 104, 106 by a horizontally oriented divider or baffle element 108. The baffle element 108 may be received and secured in position generally by the horizontal chassis elements 110, 112 within the computer, as described below. The baffle element 108 may be sized and the chassis elements of the computer system constructed so that when the baffle is installed, airflow between the two chambers 104, 106 is essentially eliminated. This elimination of airflow is advantageous in that more laminar flow is maintained within each of the two chambers, and therefore less cooling air is diverted to components which do not require cooling. Two forced airflow generators 114, 116 are mounted to the rear wall 118 of the housing 120, each within its respective chamber 104, 106 such that each airflow generator is dedicated to one chamber, and the airflow induced within each of the two chambers is generally co-linear with and flowing in the same direction ("substantially parallel") as that in the other chamber. Standard low speed, low noise cooling fans suitable for personal computer applications are preferred in this embodiment, although the objectives of the invention may also be met through use of other devices generating forced airflow in place of or in conjunction with the fans 114, 116. One such fan that may be used is the 92 mm Model No. KD1209, manufactured by Sunon. Fan mounting may be accomplished by any conventional means including threaded fasteners or tack-welding, although other methods may be used with equal success. Each fan 114, 116, is oriented on the housing rear wall 118 so as to exhaust air from its respective chamber 104, 106 through one or more perforations 122 in the rear wall 118. A separate dedicated cooling exhaust fan 115 integral with the computer power supply 60 is also provided in this embodiment. Furthermore, in the embodiment of FIG. 3, it is noted that the motherboard 152 is oriented in a vertical fashion such that the air flowpath 146 coincides with the top surface of the motherboard 152 and CPU 40.

Method of Operation of the First Embodiment

Referring again to FIG. 3, air enters each chamber 104, 106 through a series of air inlets 10 or perforations in the front wall 126 of the housing 120. Air inlets 10 of rectangular crossection may be used; however, those of other crossectional shapes may also be employed. Ambient air is drawn through the inlets in the direction shown by arrows 128 and 130 into each chamber 104, 106 by the relative low pressure created by that chamber's respective exhaust fan 114, 116. The air inlets may be disposed on said front wall 126 at an elevation roughly equivalent to and in relative transverse alignment with the rotational axis 132 of the blades of fans 114, 116 (e.g., "substantially aligned") so as to minimize changes of direction in the airflow within each chamber.

One or more of the critical components within the computer housing 120 which require cooling include the CPU 40, the disk drive cages 50, 70, and CD-ROM 80 drive. These components may be placed in close physical proximity to the air inlets for each chamber so that unheated inlet air is directly drawn over these components during induction, thereby providing one of the primary benefits of the invention. Furthermore, as will be further described herein, the critical components are disposed at vertical elevations in relation to the airflow stream 146 created by each cooling fan 114, 116 and its respective air inlets 10 to optimize component cooling while striving to minimize turbulence and maintain significant linear airflow within the chamber.

Inlet baffle elements 144 may be installed to restrict the flow of air as required in applications having more preexisting inlets than are required by the invention. That is, inlets 145 which do not have components requiring cooling in direct proximity will be baffled in order to ensure that maximum airflow is drawn through the unbaffled inlets 10 and over the components requiring cooling. The placement and orientation of the aforementioned components, coupled with baffling of the internal chambers 104, 106 and baffling of selected front wall air inlets 145 increases the efficiency of the cooling system by diverting inlet air away from components which do not require cooling. This diversion reduces the temperature increase of the air encountering the components requiring cooling, and reduces the required mass flow rate of air over these components for a given heat removal rate. Therefore, for the same inlet air temperature, either the average operating temperature of the components, or cooling fan capacity, may be reduced. This benefit has been substantiated with experimental data showing reductions in temperature of several degrees centigrade (°C.) for various components using the present invention as opposed to prior art systems with the same fan capacity.

It should be further recognized that optimum airflow will generally be obtained when the exhaust fan and respective air inlets within a given chamber are oriented in opposition to each other within the housing 120. Hence, configurations wherein the chambers, including the fans and inlets, are oriented to generate transverse (i.e., side-to-side) or top-to-bottom airflow within the housing 120 may function with equal effectiveness.

Figure 4:
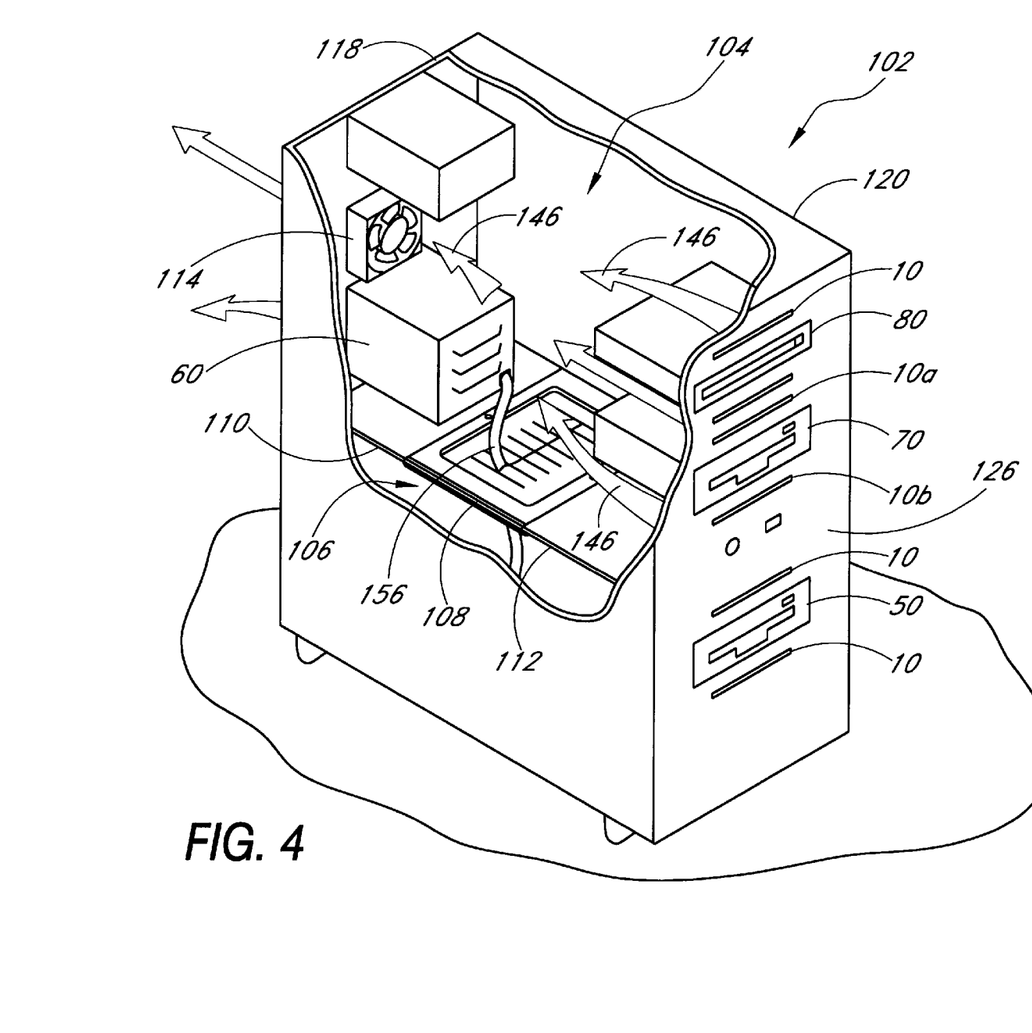
FIG. 4 is a cutaway perspective view of the computer system of FIG. 3.

FIG. 4 shows the relative arrangement of the fan 114, air inlets 10, and the various internal components associated with one chamber 104 of the computer system of FIG. 3. A generally linear flowpath of air 146 is maintained between the air inlets 10 located in the front wall 126 of the housing 120 and the cooling fan 114 located on the rear wall 118. This brings a substantially laminar flow of air into direct contact with the disk drive cage 70 and CD-ROM drive 80 located within the upper chamber 104. Note that in this embodiment, the disk drive cage 70 is disposed. between upper and lower air inlets 10a, 10b such that inlet air flows directly along the upper and lower surfaces of the drive cage 70 after induction without inducing significant turbulence within the chamber 104. Alternatively, air inlets positioned in the front wall 126 yet oriented so as to admit airflow on either side of a component may be used.

Referring again to FIGS. 3 and 4, the baffle element 108 is disposed horizontally within the housing 120 so as to form and separate the two tandem chambers 104, 106 of this embodiment. A wiring harness 156, shown here coupled to the motherboard 152, penetrates the center region of the baffle element 108 to permit electrical coupling of the components in both chambers. It can be appreciated that wiring or optical fibers passing through the baffle element may interconnect a variety of components and/or boards within the interior volume of the computer including the motherboard 152, disk drive(s) 50, 70, CD-ROM drive 80, and power supply 60. Furthermore, the internal components within a chamber 104, 106 may be oriented in a number of different ways while still providing for component cooling and maintaining substantially linear airflow within that chamber. For example, the motherboard 152 may be oriented vertically and longitudinally in the direction of airflow 146 to accomplish the same result. The power supply 60 and associated fan 115 are oriented within the chamber 104 in close proximity to the exhaust cooling fan 114 for that chamber in order to maintain the airflow path 146 as linear as possible and minimize any turbulence within the housing 120.

Detailed Description of a Second Embodiment

Figure 5:
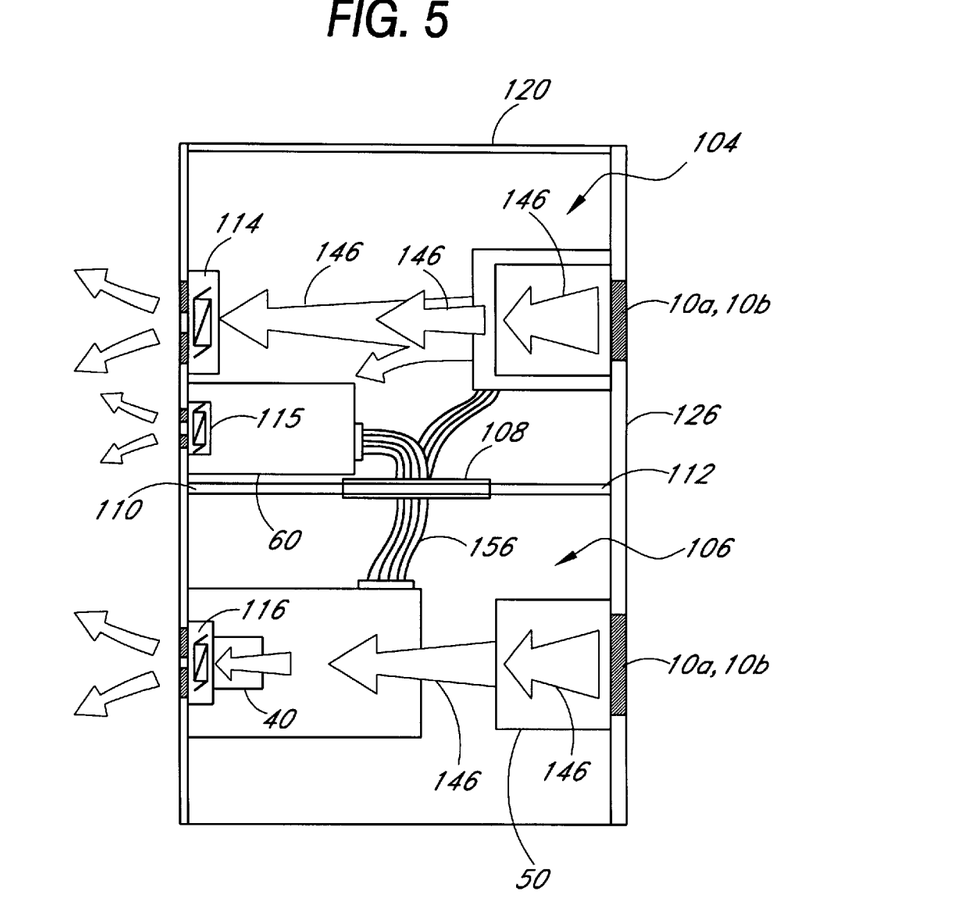
FIG. 5 is a top crossectional view of a second preferred embodiment of the chambered cooling system of the present invention installed in a desktop computer configuration.
Figure 6:
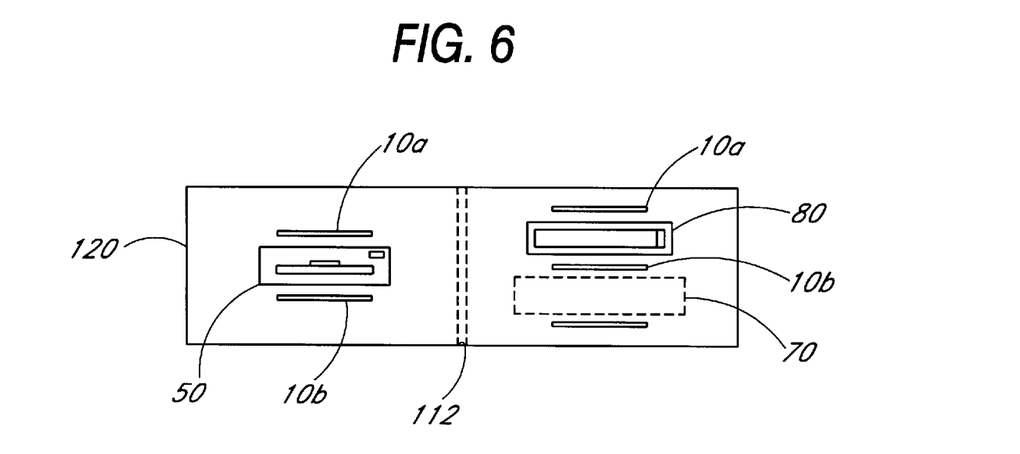
FIG. 6 is a front elevational view of the second preferred embodiment of FIG. 5.

A second embodiment of the present invention is shown in FIGS. 5 and 6. This embodiment optimal for use in a desktop computer. In this embodiment, the two cooling chambers 104, 106 are oriented in tandem (side-by-side) as opposed to the over-under orientation of the tower computer system of the first embodiment described above. The linear flowpath 146 between the cooling fans 114, 116 and air inlets 10 is maintained in this second embodiment by positioning the components within each chamber horizontally along the front wall 126 of the housing 120 in vertical alignment with the air flowpath 146, while selectively baffling any air inlets which are not required for component cooling. The internal baffle element 108 is oriented vertically and received in the housing element 110, 112, thereby preventing significant airflow vertically between the chambers 104, 106. Wiring 156 penetrates the baffle element 108 horizontally through the element's center region.

Detailed Description of a First Embodiment of the Baffle Element

Figures 7, 7A:
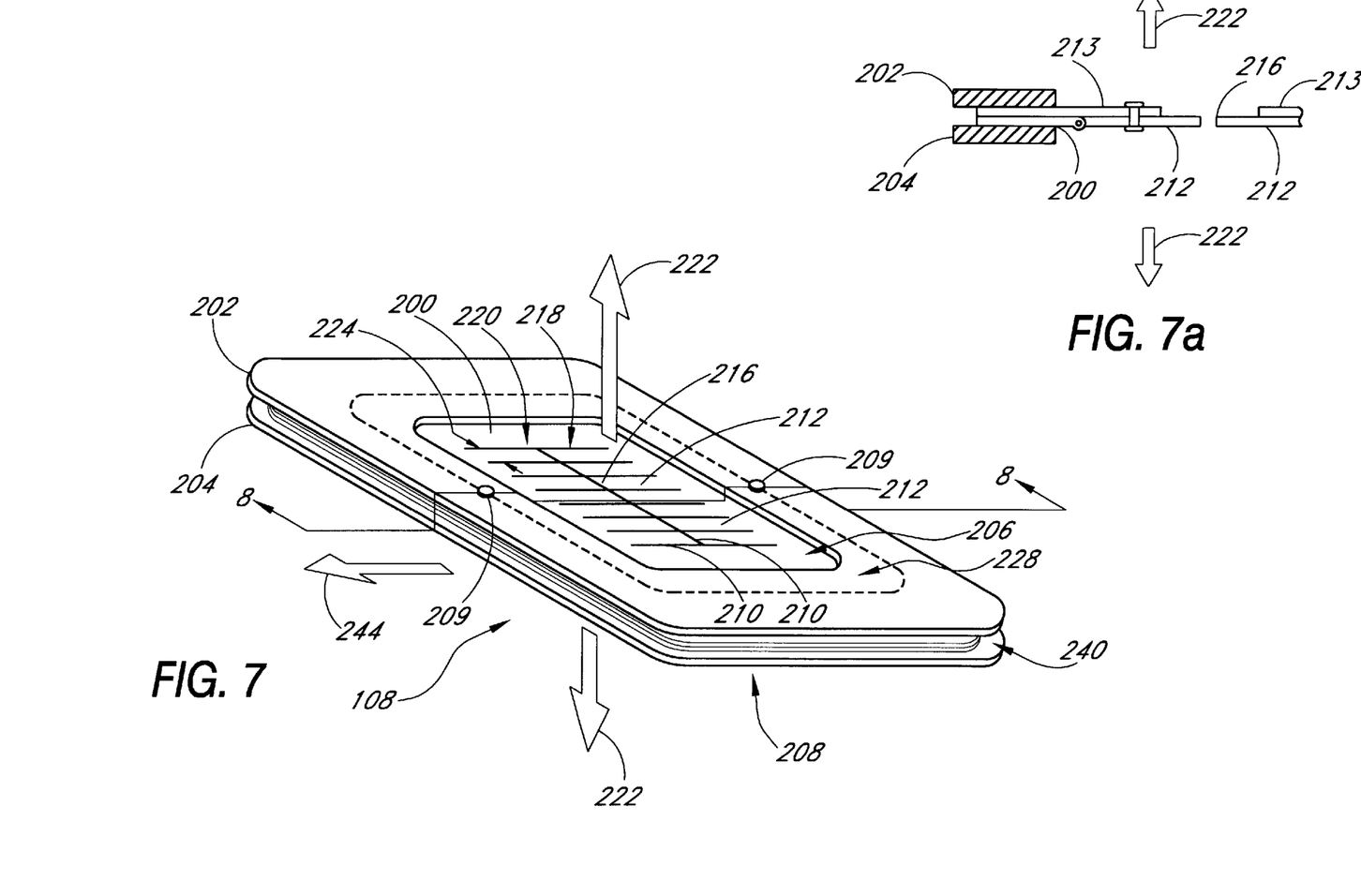
FIG. 7 is a perspective view of a first preferred embodiment of an airflow baffle element of the present invention.
FIG. 7a is a perspective view of an alternate finger arrangement used in conjunction with the first preferred embodiment of FIG. 7.
Figure 8:
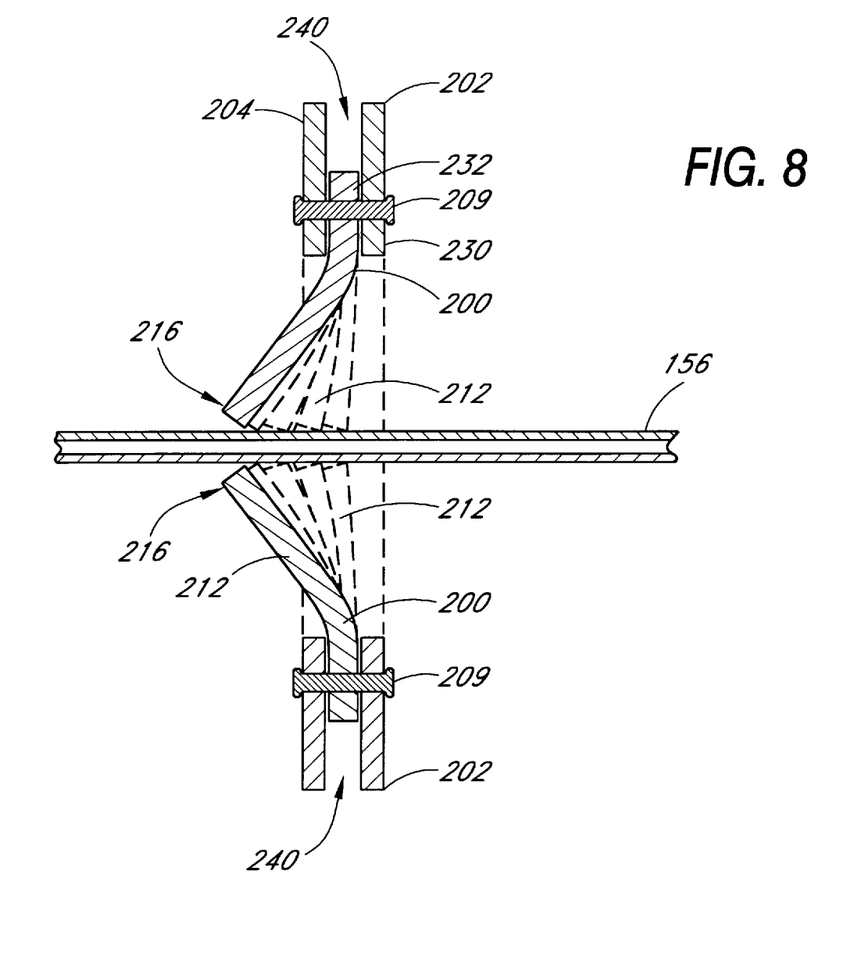
FIG. 8 is a crossectional view of the baffle element of FIG. 7, with wiring installed, taken along line 8—8 of FIG. 7.

Referring now to FIGS. 7 and 8, it is seen that a first embodiment of the baffle element 108 is constructed with a center element 200 interposed between two substantially planar support elements 202, 204. Center element 200 may be of generally rectangular shape, and may have a plurality of longitudinal and transverse perforations 210 extending through its thickness such that a plurality of individual fingers 212 are formed. The fingers 212 may be disposed in a substantially parallel orientation, with two opposing rows 218, 220 being formed such that the distal end 216 of each finger 212 is in close proximity with the distal end 216 of the corresponding finger in the opposing row. Center element 200 is constructed from any variety of flexible or elastomeric materials such as vinyl, neoprene rubber, or polyethylene such that the fingers 212 are flexible and the distal end 216 of each finger may move in a substantially normal direction 222 to the plane of the element 200, and in relation to one another. Alternatively, the center element 200 may be constructed of a substantially rigid material, and the fingers 212 pivotally attached and preloaded thereto using a flexible spring element 213 or similar arrangement, as shown in FIG. 7a. The dimensions of perforations 210 are controlled, and the diameter of each finger 224 is maintained sufficiently small such that airflow around an object of fairly small diameter (such as an electrical wire 152 or fiber-optic cable) inserted through the fingers is minimized. It can be appreciated that a variety of finger shapes and orientations may be used with equal effectiveness.

As shown in FIG. 7, the support elements 202, 204 each have a passage 206, 208 extending through a central portion thereof, such that the passages 206, 208 of both support elements 202, 204 substantially communicate when those elements are mated flush with one another. The shape of the passage 206, 208 through each support element may be configured to not restrict movement of the fingers 212 while defining a perimeter that is smaller than the perimeter of the center element 200. Thus, the passages 206, 208 may be sized to permit movement of the fingers 212, while the support elements 202, 204 act to retain the center element 200 in the desired position when assembled, as discussed below. The support elements 202, 204 may be constructed of substantially any material with sufficient rigidity to adequately retain the center element 200 in relative alignment, including plastics, rubber, composites, or metal. The support elements 202, 204 may be constructed from an ESD (electrostatic discharge) safe material.

When the baffle element 108 is assembled, the center element 200 may be maintained in position between the support elements 202, 204 by way of the overlap region 228 between the inner periphery 230 of each support element and the outer periphery 232 of the center element 200. The center element may therefore be "sandwiched" between the two support elements, all three components being held in relative position to one another through the use of rivets 209, threaded fasteners, adhesives, or similar conventional fastening means. A large variety of methods for maintaining the relative alignment between the center element 200 and the support elements may be employed with equal success and without departing from the spirit of the invention. When assembled in this fashion, a groove 240 is formed between the support elements 202, 204 which extends around the periphery of the baffle element 108.

In the embodiment of FIGS. 7 and 8, the assembled baffle element 108 may be positioned and secured within the computer housing of FIG. 3 by way of horizontal chassis elements 110, 112. Specifically, the groove 240 formed between the support elements 202, 204 receives the horizontal elements, both being sized accordingly to create a frictional fit between the chassis elements 110, 112 and the interior surfaces of the support elements 202, 204 forming the groove 240 such that the baffle element may slide in a horizontal direction 244 during system maintenance to permit easy installation and removal. Alternatively, in the computer system of FIG. 5, the baffle element slides vertically during installation and removal. It should be recognized that a substantial number of alternative methods and apparatus for mounting and retaining the baffle element within the computer interior volume may be used with equal effectiveness, including the use of threaded fasteners or retaining clips. Alternatively, the baffle element may be permanently affixed to the computer chassis (such as by adhesives or welding) if so desired.

As previously mentioned, the baffle element 108 is sized and the chassis elements 110, 112 constructed such that when the baffle element is received by the chassis elements, airflow between the chambers 104, 106 is substantially eliminated. Airtight sealing of the sliding grooves 240, 242 or other mounting apparatus is not required in that some leakage around the baffle element 108 is allowable; however, gross leakage through or around the baffle will mitigate the benefits provided by the invention.

As shown in FIG. 8, an electrical wire or ribbon cable 156 is passed through the thickness of the baffle element 108 by way of the perforations 210 in the center element 200. The flexible fingers 212 deflect thereby permitting passage of the cable 156 through the baffle element 108, while the resiliency of the fingers 212 maintain their distal ends 216 in contact with the cable 156 so as to mitigate the flow of air around the cable and therefore between the individual chambers 104, 106 within the computer housing 120. It can be appreciated that cables of varying sizes and configurations may pass through the perforations 210 of the center element 200 in this manner.

Detailed Description of a Second Embodiment of the Baffle Element

Figure 9:
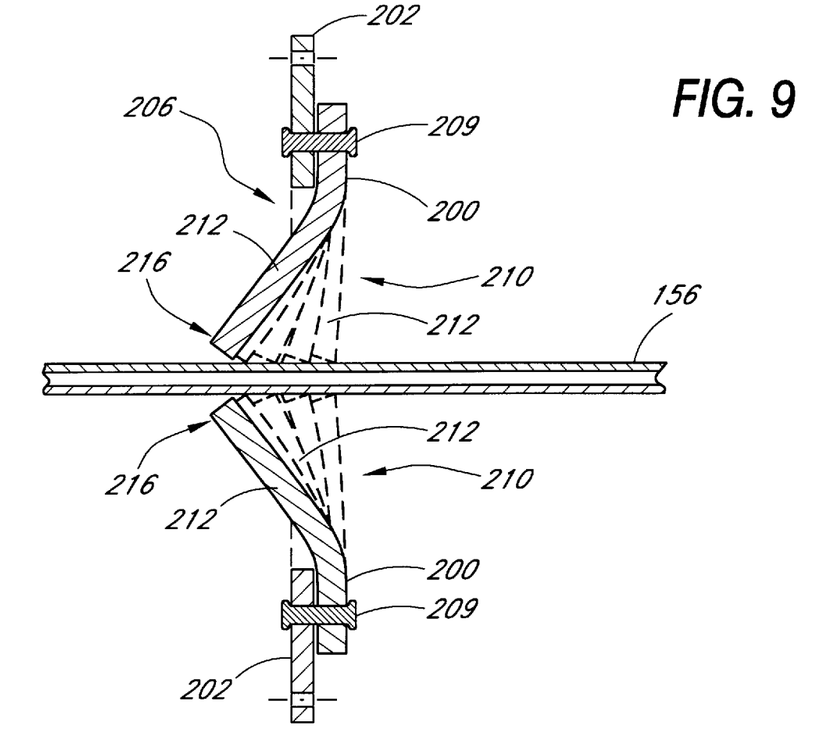
FIG. 9 is a crossectional view of a second preferred embodiment of the airflow baffle element of the present invention, with electrical wiring installed.

FIG. 9 shows a second embodiment of the baffle element of the present invention. In this embodiment, the baffle element may be constructed using a single support element 202 for reduced weight and space. This single support element 202 is mated to the flexible center element 200 such that the passage 206 substantially aligns with the fingers 212 within the center element 200, thereby providing the fingers 212 with sufficient transverse mobility. The center portion 200 is mounted to the support element 202 using any of the aforementioned conventional fastening techniques, thereby maintaining both elements 200, 202 in relative alignment during use. In this embodiment, the support element supports the weight of the center element 200 and electrical wires 152 penetrating between the fingers 212 during use. The baffle element may then be slidably, pivotally, or permanently mounted, as desired, to the computer chassis using any number of techniques well understood in the art.

Detailed Description of a Third Embodiment of the Baffle Element

Figure 10:
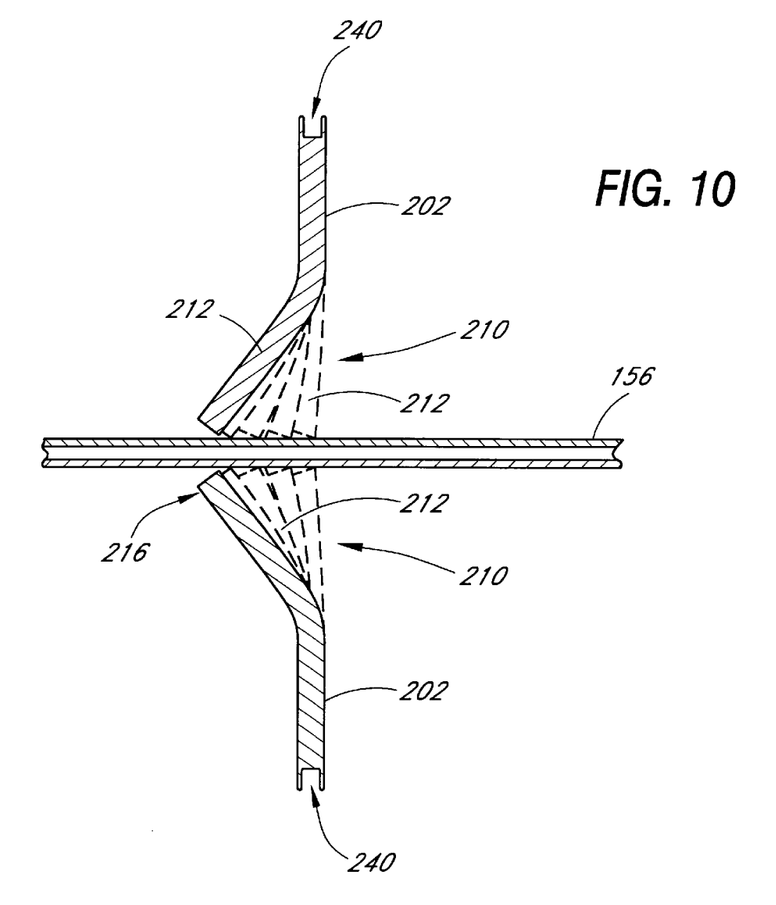
FIG. 10 is a crossectional view of a third preferred embodiment of the airflow baffle element of the present invention, with electrical wiring installed.

FIG. 10 shows a third embodiment of the present invention, wherein the baffle support element 202 and fingers 212 are unified and fabricated from one or more sheets of resilient material. Transverse and longitudinal perforations 210 made in the material create the fingers 212, which may be flexed into and out of the plane of the support element to permit cabling or other objects to pass through. The material used for the support element 202 and fingers 212 of this embodiment provides mechanical stability and strength when the baffle element 108 is installed in the computer chassis, and also permits dislocation of the fingers without breaking, and sealing of the installed cable 156. Polyethylene or other similar plastics may be used to form the support element 202, although other types of material will suffice. The material used in this embodiment for the support element 202 and fingers 212 may be ESD safe. This embodiment carries the primary benefit of great simplicity of manufacture.

Detailed Description of a Fourth Embodiment of the Baffle Element

Figure 11:
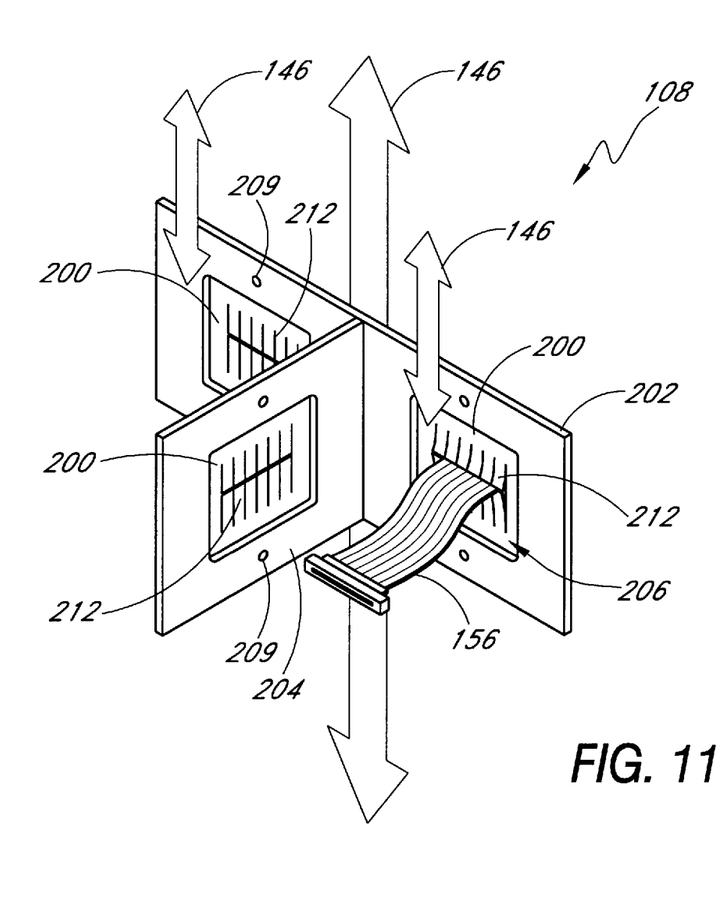
FIG. 11 is a perspective view of a fourth preferred embodiment of the airflow baffle element of the present invention, with electrical wiring installed.
Figure 12:
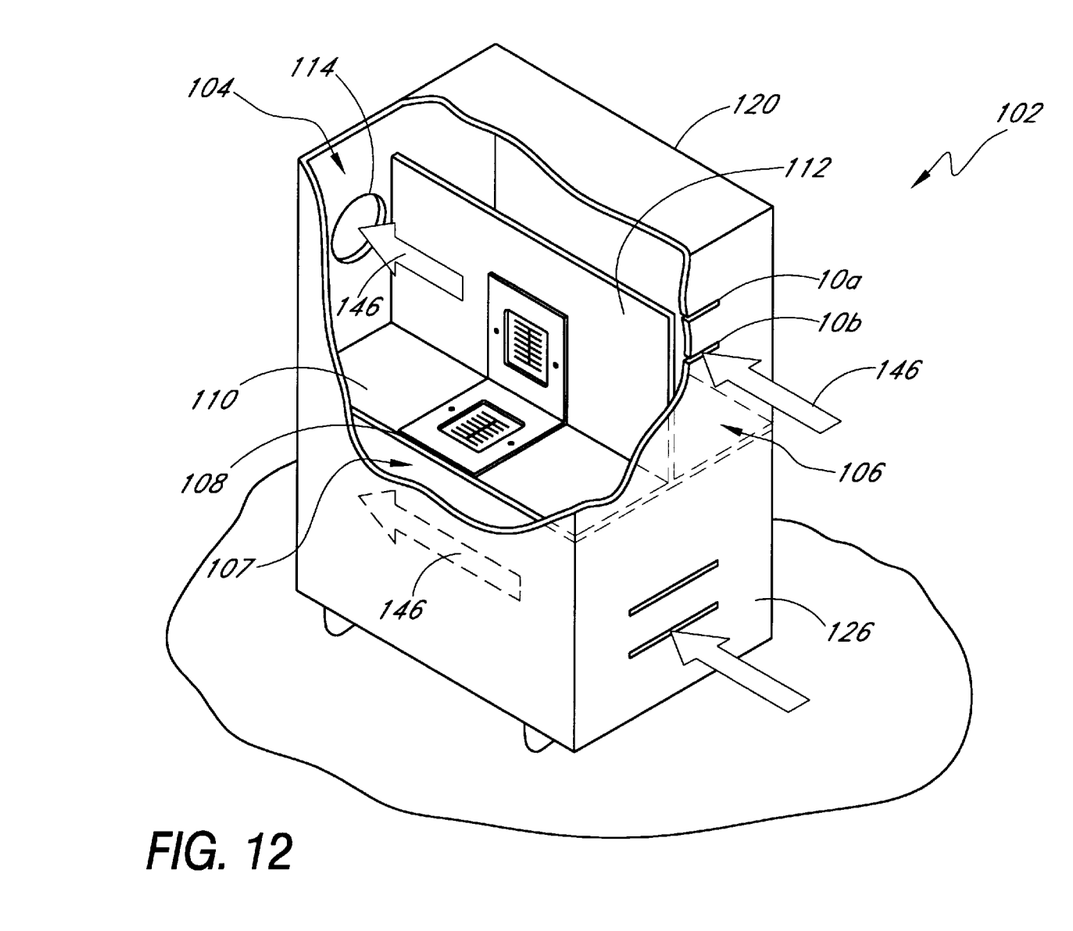
FIG. 12 is a cutaway perspective view of a tower computer system, illustrating the baffle element of FIG. 11 installed therein.

FIG. 11 shows a fourth embodiment of the baffle element 108 of the present invention. In this embodiment, a three-chamber baffle element is constructed through the. use of two discrete support elements 202, 204 mated to one another at right or oblique angles. One or more center elements 200 are mated to the support elements in alignment with their passages 206 to permit the sealed passage of electrical wires or other objects between each of the three chambers created when the baffle element 108 is installed within a computer housing 120. By orienting the air inlets and fans in each of the three chambers so that air flows in the directions shown by the arrows 146, substantially linear airflow can be maintained in each chamber. For example, the baffle element 108 shown in FIG. 11 could be installed in a tower-type housing 120 as previously described such that the direction of airflow 146 in all three chambers, 104, 106, 107 is oriented front-to-back, as shown in FIG. 12. A large number of different baffle element geometries and arrangements are contemplated, depending on the configuration of the computer system chassis into which the baffle is being fit, the number of desired chambers, and the number of available cooling fans.

SUMMARY

As has been described herein, the chambered forced cooling system of the present invention provides enhanced cooling of critical computer or electronic system components, thereby increasing component longevity and improving overall system reliability. Most notably, this enhanced cooling is provided with no increase in fan capacity or required reduction in inlet air temperature. Additionally, the baffle element used with the system allows for the routing of electrical cabling throughout the interior of the enclosure such that the desired airflow within each of the chambers (and increased efficiency resulting therefrom) are preserved. Maintenance of the system is also facilitated through the easy installation and removal of the baffle element(s) and any cabling routed-therein.

While the above detailed description has shown, described, and pointed out the fundamental novel features of the invention as applied to various embodiments, it will be understood that various omissions, substitutions, and changes in the form and details of the device or process illustrated may be made by those skilled in the art without departing from the spirit or essential characteristics of the invention. The described embodiments are to be considered in all respects only as illustrative and not restrictive. The scope of the invention is, therefore, indicated by the appended claims rather than by the foregoing description. All changes which come within the meaning and range of equivalence of the claims are to be embraced within their scope.

What is claimed is:

1. A method of cooling the internal components of a computer system, the method comprising:

disposing said internal components within a housing;
   securing a divider having a plurality of substantially coplanar and individually moveable fingers within said housing so as to define a plurality of chambers therein, each of said chambers respectively having an air inlet;

positioning an airflow generator, respectively, within each of said chambers so as to be substantially opposed to said respective air inlet, each of said airflow generators being operable to exhaust air from said respective chamber;

locating at least one of said internal components in proximity to said respective air inlet, and substantially between said air inlet and said respective airflow generator; and generating airflow within each of said chambers to cool said internal components.

2. The method of claim 1, wherein said airflow within each chamber is substantially linear.

3. The method of claim 1, wherein said internal components include one or more elements selected from a group consisting of a central processing unit, a compact disk read-only memory storage device (CD-ROM), a magnetic disk drive, a digital signal processor, a memory, an interface card, a modulator-demodulator (MODEM), a computer power supply, a transformer, and a circuit board.

4. A method of cooling components disposed within the interior of an enclosure, comprising:

dividing the interior of the enclosure into a plurality of chambers, at least two of said chambers being divided by a baffle element having a plurality of substantially coplanar and individually moveable fingers, each of said chambers further having an air inlet and an air outlet;

generating a substantially linear airflow stream between said air inlet and said air outlet within at least one of said plurality of chambers; and locating at least one of the components in said at least one chamber at a position between said air inlet and said air outlet such that heat is carried away from said at least one component by said airflow stream.

5. The method of claim 1, wherein the act of securing said divider in claims 1 further includes the act of forming said divider as a single piece of material.

6. The method of claim 5, wherein said act of forming said divider uses a polymer.

7. The method of claim 1, wherein the act of generating airflow is accomplished at least in part using a rotary fan.

8. The method of claim 1, wherein the act of securing a divider within said housing so as to define a plurality of chambers forms chambers which are in a side-by-side configuration.

9. The method of claim 1, wherein the act of securing a divider within said housing so as to define a plurality of chambers forms chambers which are in an over-under configuration.

10. The method of claim 1, wherein the act of securing a divider within said housing so as to define a plurality of chambers forms two chambers.

11. The method of claim 1, wherein the act of generating airflow within said chambers is performed selectively within at least one chamber based on environmental conditions within said housing.

12. The method of claim 4, wherein the act of locating said at least one component in said at least one chamber is performed such that said at least one component is in close proximity to said air inlet for said chamber.

* * * * *